(12) United States Patent
Xiao

(10) Patent No.: US 11,541,644 B2
(45) Date of Patent: Jan. 3, 2023

(54) DISPLAY MODULE

(71) Applicant: WUHAN CHINA STAR OPTOELECTRONICS TECHNOLOGY CO., LTD., Wuhan (CN)

(72) Inventor: Shiyuan Xiao, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 226 days.

(21) Appl. No.: 16/620,067

(22) PCT Filed: Sep. 27, 2019

(86) PCT No.: PCT/CN2019/108422
§ 371 (c)(1),
(2) Date: Dec. 6, 2019

(87) PCT Pub. No.: WO2020/237947
PCT Pub. Date: Dec. 3, 2020

(65) Prior Publication Data
US 2021/0331454 A1    Oct. 28, 2021

(30) Foreign Application Priority Data
May 30, 2019 (CN) .......................... 201910463134.X

(51) Int. Cl.
*B32B 27/28* (2006.01)
*G02F 1/1333* (2006.01)
*F21V 8/00* (2006.01)

(52) U.S. Cl.
CPC .......... *B32B 27/281* (2013.01); *G02B 6/0051* (2013.01); *G02B 6/0093* (2013.01);
(Continued)

(58) Field of Classification Search
CPC .......... B32B 27/281; B32B 2307/7265; B32B 2457/20; G02B 6/0051; G02B 6/0093;
(Continued)

(56) References Cited

U.S. PATENT DOCUMENTS

| 2005/0212991 A1* | 9/2005 | Sugawara ......... G02F 1/133308 |
| | | 349/58 |
| 2006/0007700 A1* | 1/2006 | Hsu ....................... G02B 6/0056 |
| | | 362/600 |

(Continued)

FOREIGN PATENT DOCUMENTS

| CN | 1673832 A | 9/2005 |
| CN | 103455193 A | 12/2013 |

(Continued)

OTHER PUBLICATIONS

International Search Report issued in International Application No. PCT/CN2019/108422 dated Feb. 12, 2020 (2 pages).

(Continued)

*Primary Examiner* — John D Freeman
(74) *Attorney, Agent, or Firm* — Osha Bergman Watanabe & Burton LLP

(57) ABSTRACT

A display module is provided, which encloses a display assembly by using a flexible cover, thereby sealing a first gap between a backlight housing and a support structure and a second gap between the support structure and a display panel. It can isolate external water vapor and dust from entering an interior of the display assembly, thereby improving the dustproof and waterproof capabilities of the display module, and further improving the reliability of the display module.

14 Claims, 3 Drawing Sheets

(52) U.S. Cl.
CPC .................. *G02F 1/133311* (2021.01); *B32B 2307/7265* (2013.01); *B32B 2457/20* (2013.01)

(58) Field of Classification Search
CPC ... G02F 1/133311; G09F 9/00; H05K 5/0239; H05K 5/03; H05K 5/069
See application file for complete search history.

(56) References Cited

U.S. PATENT DOCUMENTS

| | | | |
|---|---|---|---|
| 2016/0306480 A1 | 10/2016 | Park et al. | |
| 2017/0052407 A1 | 2/2017 | Moro et al. | |
| 2017/0139122 A1* | 5/2017 | Zhou | ................... G02B 6/0088 |

FOREIGN PATENT DOCUMENTS

| | | |
|---|---|---|
| CN | 106054450 A | 10/2016 |
| CN | 207096629 U | 3/2018 |
| CN | 110164299 A | 8/2019 |

OTHER PUBLICATIONS

Written Opinion issued in International Application No. PCT/CN2019/108422 dated Feb. 12, 2020 (4 pages).

* cited by examiner

DISPLAY MODULE

FIELD OF INVENTION

The present application relates to a field of in-vehicle display technologies, and in particular, to a display module for a vehicle.

BACKGROUND OF INVENTION

With developments of display panel technology and automotive technology, low temperature poly-silicon (LTPS) display modules are widely used in the automotive field due to their narrow bezel characteristics. Therefore, reliability requirements of vehicle LTPS display modules are also getting higher and higher.

Technical Problem

In current vehicle LTPS display modules, a cover is fixed to the display module by a fixing tape. However, there is a gap at an edge of the fixing tape, so that water vapor, dust, and the like are easily entered an interior of the display module from the gap, thus affecting the reliability of the display module.

SUMMARY OF INVENTION

Technical Solution

An embodiment of the present application provides a display module, which can improve reliability of the display module.

An embodiment of the present application provides a display module, which includes a display assembly and a flexible cover.

The display assembly includes a backlight housing including bottom wall and a side wall enclosed as an accommodation space; a backlight module received in the accommodation space; a support structure positioned on the side wall of the backlight housing; and a display panel disposed on the support structure. The flexible cover covers the display assembly and seals a first gap between the backlight housing and the support structure and a second gap between the support structure and the display panel.

In a display module provided by the embodiment of the present application, the flexible cover includes a first portion corresponding to a side of the support structure, a second portion corresponding to the display panel, a third portion corresponding to the bottom wall of the backlight housing, and a fourth portion corresponding to another side of the support structure, wherein the first portion is connected to the second portion and the third portion, and the fourth portion is connected to the second portion and the third portion.

In a display module provided by the embodiment of the present application, the flexible cover includes a hardened layer, a base layer, and a glue layer, and the base layer is disposed between the hardened layer and the glue layer.

In a display module provided by the embodiment of the present application, the flexible cover is attached to the display assembly by the glue layer.

In a display module provided by the embodiment of the present application, the hardened layer, the base layer, and the glue layer are transparent materials.

In a display module provided by the embodiment of the present application, material of the base layer is polyimide.

In a display module provided by the embodiment of the present application, the hardened layer has a scratch-resistant and wear-resistant effect.

In a display module provided by the embodiment of the present application, the support structure includes a body portion, a first extension portion, and a second extension portion; the body portion is disposed on the side wall; the first extension portion is disposed on a side of the body portion adjacent to the side wall and extends toward the bottom wall, and the first extension portion is positioned at a side of the side wall away from the accommodation space; the second extension portion is disposed on a side of the body portion adjacent to the side wall, and a extending direction of the second extension portion and a extending direction of the first extension portion have a predetermined angle, and the second extension portion is positioned on the backlight module.

In a display module provided by the embodiment of the present application, the first portion is attached to a side of the first extension portion away from the side wall and a side of the body portion away from the side wall.

In a display module provided by the embodiment of the present application, the second portion is attached to a side of the body portion away from the second extension portion and a side of the display panel away from the backlight module.

In a display module provided by the embodiment of the present application, the third portion includes a first sub-portion and a second sub-portion, the first sub-portion is connected to the first portion, the second sub-portion is connected to the fourth portion, and the first sub-portion and the second sub-portion are attached to a side of the bottom wall away from the backlight module.

In a display module provided by the embodiment of the present application, the first sub-portion is connected to the second sub-portion.

In a display module provided by the embodiment of the present application, an interspace is provided between the first sub-portion and the second sub-portion.

In a display module provided by the embodiment of the present application, the fourth portion is attached to a side of the first extension portion away from the side wall and a side of the body portion away from the side wall.

In a display module provided by the embodiment of the present application, a gap is provided between the backlight module and the side wall and the second extension portion.

In a display module provided by the embodiment of the present application, the backlight module includes a reflective sheet, a light guide plate, and a brightness enhancement film sequentially stacked from bottom to top.

In a display module provided by the embodiment of the present application, the brightness enhancement film includes a lower diffusion sheet, a lower brightness enhancement sheet, an upper brightness enhancement sheet, and an upper diffusion sheet sequentially stacked from bottom to top.

In a display module provided by the embodiment of the present application, the display panel includes a lower polarizer, a thin film transistor substrate, a color filter substrate, and an upper polarizer sequentially stacked from bottom to top.

Beneficial Effect

An embodiment of the present application provides a display module, the display module including a display assembly and a flexible cover. The display assembly comprises a backlight housing including bottom wall and a side wall enclosed as an accommodation space, a backlight module received in the accommodation space, a support structure positioned on the side wall of the backlight housing, and a display panel disposed on the support structure. The flexible cover covers the display assembly and seals a gap between the backlight housing and the support structure and a gap between the support structure and the display panel. The solution encloses the display assembly by using a flexible cover plate, and isolates external water vapor and dust from entering an interior of the display assembly, thereby improving the dustproof and waterproof capabilities of the display module, and further improving the reliability of the display module.

DETAILED DESCRIPTION OF EMBODIMENTS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art can obtain the other drawings without any creative effort.

An embodiment of the present application provides a display module, which will be described in detail below.

Figure 1:
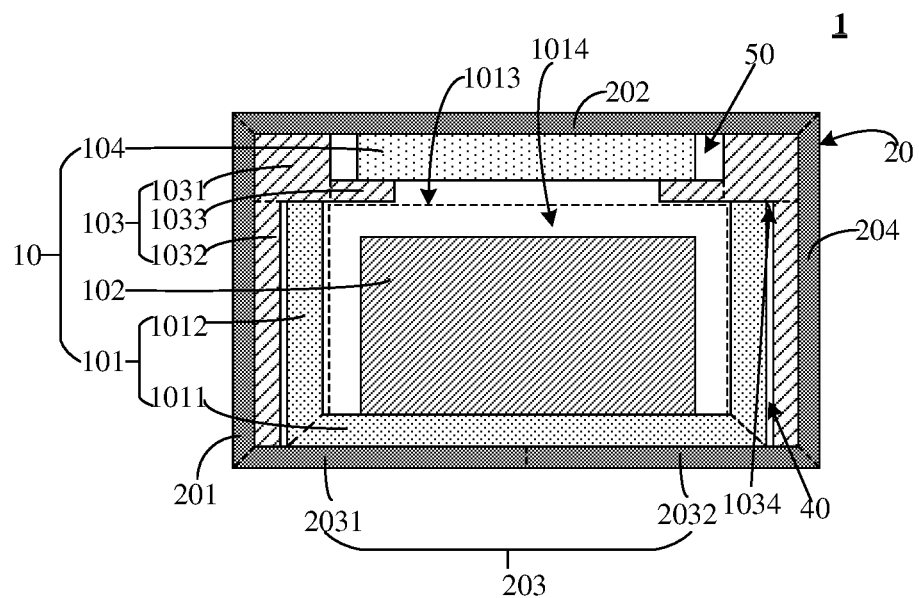
FIG. 1 is a schematic structural diagram of a display module according to an embodiment of the present application.

Please refer to FIG. 1, FIG. 1 is a schematic structural diagram of a display module according to an embodiment of the present application. The display module 1 can include a display assembly 10 and a flexible cover 20.

The display assembly 10 can include a backlight housing 101, a backlight module 102, a support structure 103, and a display panel 104. It should be noted that the display assembly 10 includes but is not limited to above components, and the display assembly 10 can further include other components such as a control chip, a fixing tape, and the like.

The backlight housing 101 can include bottom wall 1011 and a side wall 1012. The bottom wall 1011 and the side wall 1012 can be enclosed as an accommodation space 1013. The accommodation space 1013 can be used to receive the backlight module 102. The bottom wall 1011 can be used to place the backlight module 102, and the side wall 1012 can be used to support the support structure 103.

Figure 2:
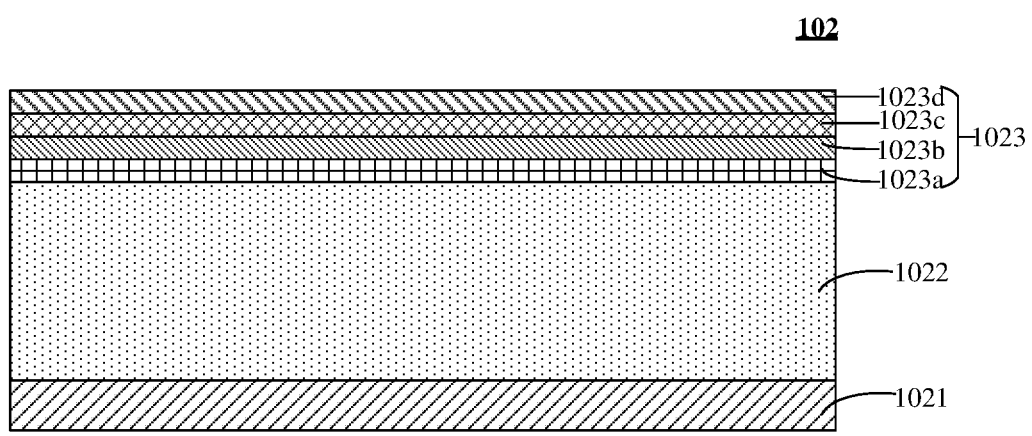
FIG. 2 is a schematic structural diagram of a backlight module according to an embodiment of the present application.

The backlight module 102 can be received in the accommodation space 1013, and the backlight module 102 can be used to provide a light source for the display panel 104. The backlight module 102 is attached to the bottom wall 1011 of the backlight housing 101. Referring to FIG. 2, the backlight module 102 can include a reflective sheet 1021, a light guide plate 1022, and a brightness enhancement film 1023 sequentially stacked in this order from bottom to top. The brightness enhancement film 1023 can include a lower diffusion sheet 1023*a*, a lower brightness enhancement sheet 1023*b*, an upper brightness enhancement sheet 1023*c*, and an upper diffusion sheet 1023*d* which are sequentially stacked from bottom to top. The specific functions of the reflective sheet 1021, the light guide plate 1022, and the brightness enhancement film 1023 are common knowledge, and will not be further described herein.

The support structure 103 can be disposed on the side wall 1012 of the backlight housing 101. The support structure 103 can include a body portion 1031, a first extension portion 1032, and a second extension portion 1033.

The body portion 1031 is disposed on the side wall 1012 of the backlight casing 101. The first extension portion 1032 is disposed on a side of the body portion 1031 near the side wall 1012. The first extension portion 1032 extends in a direction toward the bottom wall 1011. The first extension portion 1032 is positioned on a side of the side wall 1012 away from the accommodation space 1013. The second extension portion 1033 is disposed on a side of the body portion 1031 adjacent to the side wall 1012. An extending direction of the second extension portion 1033 and an extending direction of the first extension portion 1032 have a predetermined angle 1034. The predetermined angle 1034 can be between 80° and 100°. Preferably, the predetermined angle is 90°. The second extension 1033 is positioned above the backlight module 102. The second extension 1033 can be used to support the display panel 104. It should be noted that the second extension 1032 of the support structure 103 has a first gap 40 between the side wall 1012 of the backlight housing 101.

In some embodiments, a buckle structure can be disposed on the support structure 103 and the side wall 1012, respectively, and the support structure 103 and the side wall 1012 are clamped by the buckle structure. It is also possible to add a fixing tape between the support structure 103 and the side wall 1012, and the support structure 103 and the side wall 1012 are fixedly connected by a fixing tape.

It should be noted since the brightness enhancement film 1023 expands when the light is subjected to the reinforcing work, it is damaged by the pressing of the second extension portion 1033 of the support structure 103 or the side wall 1012 of the backlight housing 101 during the expansion of the brightness enhancement film 1023. Therefore, it is necessary to reserve a buffer space between the backlight module 102 and the side wall 1012 of the backlight housing 101 and the second extension 1033 of the support structure 103. Specifically, a gap 1014 can be provided between the backlight module 102 and the side wall 1012 of the backlight housing 101 and the second extension 1033 of the support structure 103 and serves as a buffer space.

The display panel 104 can be disposed on the support structure 103. Display panel 104 can be used to display images. In some embodiments, the display panel 104 can be fixedly connected to the support structure 103 by a fixing tape. The display panel 104 has a second gap 50 between the body portion 1031 of the support structure 103.

Figure 3:
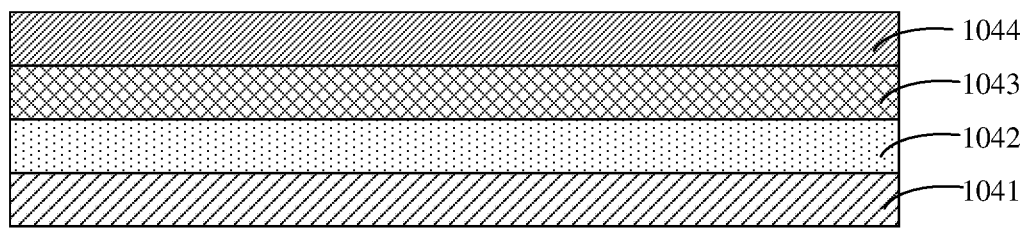
FIG. 3 is a schematic structural diagram of a display panel according to an embodiment of the present application.
Figure 4:
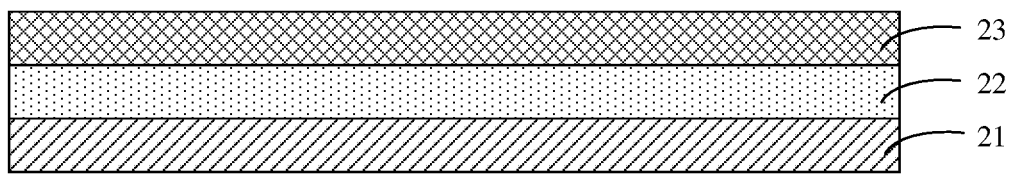
FIG. 4 is a schematic structural diagram of a flexible cover plate according to an embodiment of the present application.

Referring to FIG. 3, the display panel 104 can include a lower polarizer 1041, a thin film transistor substrate 1042, a color filter substrate 1043, and an upper polarizer 1044 sequentially stacked in this order from bottom to top.

In order to prevent outside moisture, dust, and the like from entering the display assembly 10, a flexible cover 20 can be provided. The flexible cover 20 can be wrapped over the display assembly 10 to cover the gaps on the display assembly 10 to prevent outside moisture, dust, and the like from entering the display assembly 10.

The flexible cover 20 can include a hardened layer 21, a base layer 22, and a glue layer 23. The base layer 22 is disposed between the hardened layer 21 and the glue layer 23. The hardened layer 21 has a scratch-resistant and wear-resistant effect and can serve to protect the base layer 22. The base layer 22 can be made of a transparent polyimide (PI) material, and the PI material has a high temperature resistance, which is advantageous for forming the hardened layer 21 by sputtering or evaporation. The glue layer 23 is mainly used for bonding and fixing the flexible cover 20 to the display assembly 10. The flexible cover 20 can be attached to the display assembly 10 through the glue layer 23. It should be noted that the hardened layer 21, the base material layer 22, and the glue layer 23 are all transparent materials, that is, the flexible cover 20 is transparent.

The flexible cover 20 encloses the display assembly 10 and seals the first gap 40 between the backlight housing 101 and the support structure 103, and the second gap 50 between the support structure 103 and the display panel 104. The flexible cover 20 can include a first portion 201 disposed corresponding to one side of the support structure 103, a second portion 202 disposed corresponding to the display panel 104, a third portion 203 disposed corresponding to the bottom wall 1011 of the backlight housing 101, and a fourth portion 204 disposed corresponding to the other side of the support structure 103. The first portion 201 is connected between the second portion 202 and the third portion 203. The fourth portion 204 is connected between the second portion 202 and the third portion 203. It can be understood that since the flexible cover 20 is transparent, the second portion 202 of the flexible cover 20 can be transparent to guide the light, and the display panel 104 can be displayed through the second portion 20.

Figure 5:
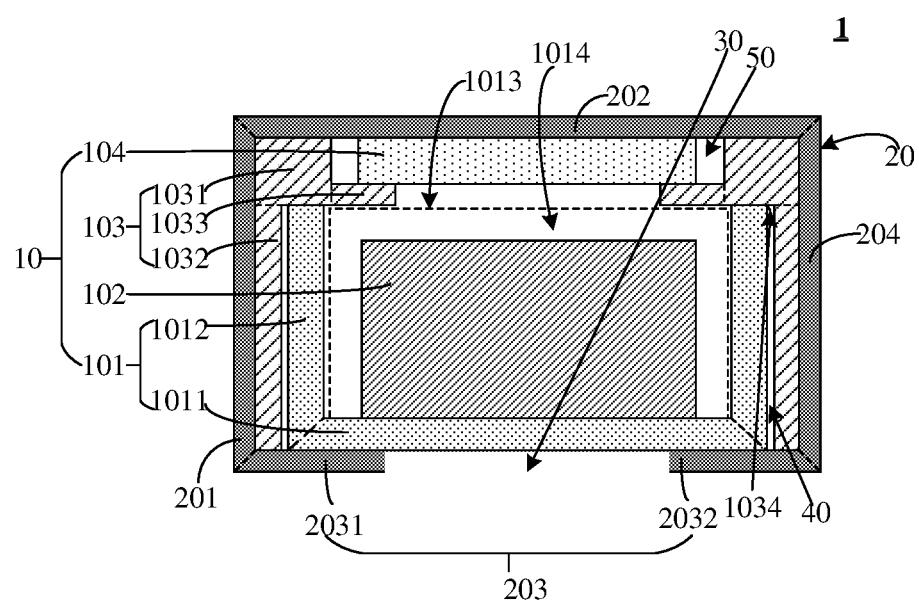
FIG. 5 is another schematic structural diagram of a display module according to an embodiment of the present application.

The third portion 203 of the flexible cover 20 can include a first sub-portion 2031 and a second sub-portion 2032, and the first sub-portion 2031 and the second sub-portion 2032 can be directly connected. In some embodiments, referring to FIG. 5, for material cost, an interspace 30 can be reserved between the first sub-portion 2031 and the second sub-portion 2032 to shorten a length of the first sub-portion 2031 and the second sub-portion 2032. It should be noted that the first sub-portion 2031 and the second sub-portion 2032 need to cover the first gap 40 between the first extension portion 1032 of the support structure 103 and the bottom wall 1011 of the backlight housing 101. It can be understood that the first sub-portion 2031 is connected to the first portion 201 and the second sub-portion 2032 is connected to the fourth portion 204.

The first portion 201 is attached to a side of the first extension portion 1032 away from the side wall 1012 and a side of the body portion 1031 away from the side wall 1012. The second portion 202 is attached to a side of the body portion 1031 away from the second extension portion 1033 and a side of the display panel 104 away from the backlight module 102. The third portion 203 is attached to a side of the bottom wall 1011 away from the backlight module 102, that is, the first sub-portion 2031 and the second sub-portion 2031 are attached to the side of the bottom wall 1011 of the backlight housing 101 away from the backlight module 102. The fourth portion 204 is attached to a side of the first extension portion 1032 away from the side wall 1012 and a side of the body portion 1031 away from the side wall 1012.

The display module 1 provided by the embodiment of the present application which encloses the display assembly 10 by using the flexible cover 20, thereby sealing the first gap 40 between the backlight housing 101 and the support structure 103 and the second gap 50 between the support structure 103 and the display panel 104. Therefore, it can isolate external water vapor and dust from entering an interior of the display assembly, thereby improving the dustproof and waterproof capabilities of the display module 1, and further improving the reliability of the display module.

In the above embodiments, the descriptions of the various embodiments are different, and the details that are not detailed in a certain embodiment can be referred to the related descriptions of other embodiments.

The display module provided by the embodiment of the present application is described in detail above. The specific examples are used to explain the principle and implementation manner of the present application. The description of the above embodiments is only for helping to understand the technical solution of the present application and its core ideas. Embodiments of the present invention have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display module comprising a display assembly and a flexible cover, wherein the display assembly comprises:
   a backlight housing comprising a bottom wall and a side wall enclosed as an accommodation space;
   a backlight module received in the accommodation space;
   a support structure positioned on the side wall of the backlight housing; and
   a display panel disposed on the support structure;
   wherein the flexible cover covers the display assembly and seals a first gap between the backlight housing and the support structure and a second gap between the support structure and the display panel;
   wherein the flexible cover comprises a first portion covering a side of the support structure, a second portion covering the display panel, a third portion covering the bottom wall of the backlight housing, and a fourth portion covering another side of the support structure;
   wherein the first portion is connected to the second portion and the third portion, and the fourth portion is connected to the second portion and the third portion; and
   wherein the support structure comprises a body portion, a first extension portion, and a second extension portion, the body portion is disposed on the side wall, the first extension portion is disposed on a side of the body portion adjacent to the side wall, extends toward the bottom wall, and is positioned at a side of the side wall away from the accommodation space, and the second extension portion is disposed on a side of the body portion adjacent to the side wall, and wherein an extending direction of the second extension portion intersects with an extending direction of the first extension portion to form a predetermined angle, and the second extension portion is positioned on the backlight module.

2. The display module according to claim 1, wherein the first portion is attached to a side of the first extension portion away from the side wall and a side of the body portion away from the side wall.

3. The display module according to claim 1, wherein the second portion is attached to a side of the body portion away from the second extension portion and a side of the display panel away from the backlight module.

4. The display module according to claim 1, wherein the third portion comprises a first sub-portion and a second sub-portion;
the first sub-portion is connected to the first portion, the second sub-portion is connected to the fourth portion, and the first sub-portion and the second sub-portion are attached to a side of the bottom wall away from the backlight module.

5. The display module according to claim 4, wherein the first sub-portion is connected to the second sub-portion.

6. The display module according to claim 4, wherein an interspace is provided between the first sub-portion and the second sub-portion.

7. The display module according to claim 1, wherein the fourth portion is attached to a side of the first extension portion away from the side wall and a side of the body portion away from the side wall.

8. The display module according to claim 1, wherein a gap is provided between the backlight module and the side wall and the second extension portion.

9. The display module according to claim 1, wherein the backlight module comprises a reflective sheet, a light guide plate, and a brightness enhancement film sequentially stacked from bottom to top.

10. The display module according to claim 9, wherein the brightness enhancement film comprises a lower diffusion sheet, a lower brightness enhancement sheet, an upper brightness enhancement sheet, and an upper diffusion sheet sequentially stacked from bottom to top.

11. The display module according to claim 1, wherein the display panel comprises a lower polarizer, a thin film transistor substrate, a color filter substrate, and an upper polarizer sequentially stacked from bottom to top.

12. A display module comprising a display assembly and a flexible cover, wherein the display assembly comprises:
a backlight housing comprising a bottom wall and a side wall enclosed as an accommodation space;
a backlight module received in the accommodation space;
a support structure positioned on the side wall of the backlight housing; and
a display panel disposed on the support structure;
wherein the flexible cover covers the display assembly and seals a first gap between the backlight housing and the support structure and a second gap between the support structure and the display panel; and
wherein the flexible cover comprises a hardened layer, a base layer, and a glue layer, and the base layer is disposed between the hardened layer and the glue layer, and wherein a material of the base layer is polyimide.

13. The display module according to claim 12, wherein the flexible cover is attached to the display assembly by the glue layer.

14. The display module according to claim 12, wherein the hardened layer, the base layer, and the glue layer are transparent materials.

* * * * *